United States Patent
Davis et al.

(10) Patent No.: US 8,757,673 B2
(45) Date of Patent: Jun. 24, 2014

(54) COVER FOR CABLE FITTING BASE

(75) Inventors: David R. Davis, Richton Park, IL (US);
Scott M. Lesniak, Lockport, IL (US);
Dennis J. Waszak, Wheaton, IL (US);
Andrew J. Chaloupka, Downers Grove, IL (US); Robert Nicoli, Glenwood, IL (US)

(73) Assignee: Pandult Corp., Tinley Park, IL (US)

( * ) Notice: Subject to any disclaimer, the term of this patent is extended or adjusted under 35 U.S.C. 154(b) by 525 days.

(21) Appl. No.: 12/555,515

(22) Filed: Sep. 8, 2009

(65) Prior Publication Data
US 2011/0057076 A1    Mar. 10, 2011

(51) Int. Cl.
*E05C 1/02* (2006.01)
*H02G 3/04* (2006.01)
*H02G 3/14* (2006.01)

(52) U.S. Cl.
CPC .............. *H02G 3/0418* (2013.01); *H02G 3/14* (2013.01)
USPC .............. 292/137; 292/152; 439/136; 174/67

(58) Field of Classification Search
CPC ...... H02G 3/0418; H02G 3/14; H02G 3/0608
USPC .............. 248/49, 74.1, 74.2, 221.11, 222.11, 248/222.12, 222.13; 220/324, 326; 174/66, 174/67; 292/151, 137, 152, 161, 256, 145, 292/150, 153; 439/135, 136
See application file for complete search history.

(56) References Cited

U.S. PATENT DOCUMENTS

| | | | | |
|---|---|---|---|---|
| 3,351,699 A * | 11/1967 | Merckle | | 174/371 |
| 3,403,220 A | 9/1968 | Riedel et al. | | |
| 3,485,937 A | 12/1969 | Caveney | | |
| 5,089,667 A | 2/1992 | Goussin et al. | | |
| 5,621,192 A | 4/1997 | Bordwell et al. | | |
| 5,706,968 A * | 1/1998 | Riley | | 220/326 |
| 5,728,976 A | 3/1998 | Santucci et al. | | |
| 5,887,745 A * | 3/1999 | Wood | | 220/326 |
| 5,942,729 A | 8/1999 | Carlson, Jr. et al. | | |
| 6,188,024 B1 | 2/2001 | Benito-Navazo | | |
| 6,476,327 B1 * | 11/2002 | Bernard et al. | | 174/101 |
| 6,554,327 B1 * | 4/2003 | Riley | | 292/152 |
| 6,677,533 B2 | 1/2004 | Bernard et al. | | |
| 6,793,096 B1 * | 9/2004 | Seok | | 220/788 |
| 6,810,191 B2 | 10/2004 | Ferris et al. | | |
| 6,835,891 B1 | 12/2004 | Herzog et al. | | |
| 6,909,044 B2 | 6/2005 | Ewer et al. | | |
| 6,934,456 B2 | 8/2005 | Ferris et al. | | |
| 7,041,897 B2 | 5/2006 | Herzog | | |
| 7,060,901 B2 | 6/2006 | Herzog et al. | | |
| 7,113,685 B2 | 9/2006 | Ferris et al. | | |
| 7,224,880 B2 | 5/2007 | Ferris et al. | | |
| 7,326,863 B2 | 2/2008 | Herzog | | |
| 7,411,126 B2 | 8/2008 | Herzog et al. | | |

(Continued)

*Primary Examiner* — Todd M Epps
(74) *Attorney, Agent, or Firm* — Christopher S. Clancy; Aimee E. McVady

(57) ABSTRACT

A cover is releasably secured to a fitting base. The fitting base includes a bottom and sidewalls with a top edge. The cover includes a top having a latch receiving area, a bottom opposite the top and a sliding latch. The sliding latch is positioned on the latch receiving area of the cover. The sliding latch includes a first end with a finger tab, a main body and a second end with locking feet. In the closed position, the sliding latch secures the cover to the cable fitting base.

9 Claims, 23 Drawing Sheets

(56) References Cited

U.S. PATENT DOCUMENTS

| | | |
|---|---|---|
| 7,469,090 B2 | 12/2008 | Ferris et al. |
| 8,251,409 B2 * | 8/2012 | Chang et al. .................. 292/137 |
| 2009/0303668 A1 * | 12/2009 | Zhao et al. ............... 361/679.01 |

\* cited by examiner

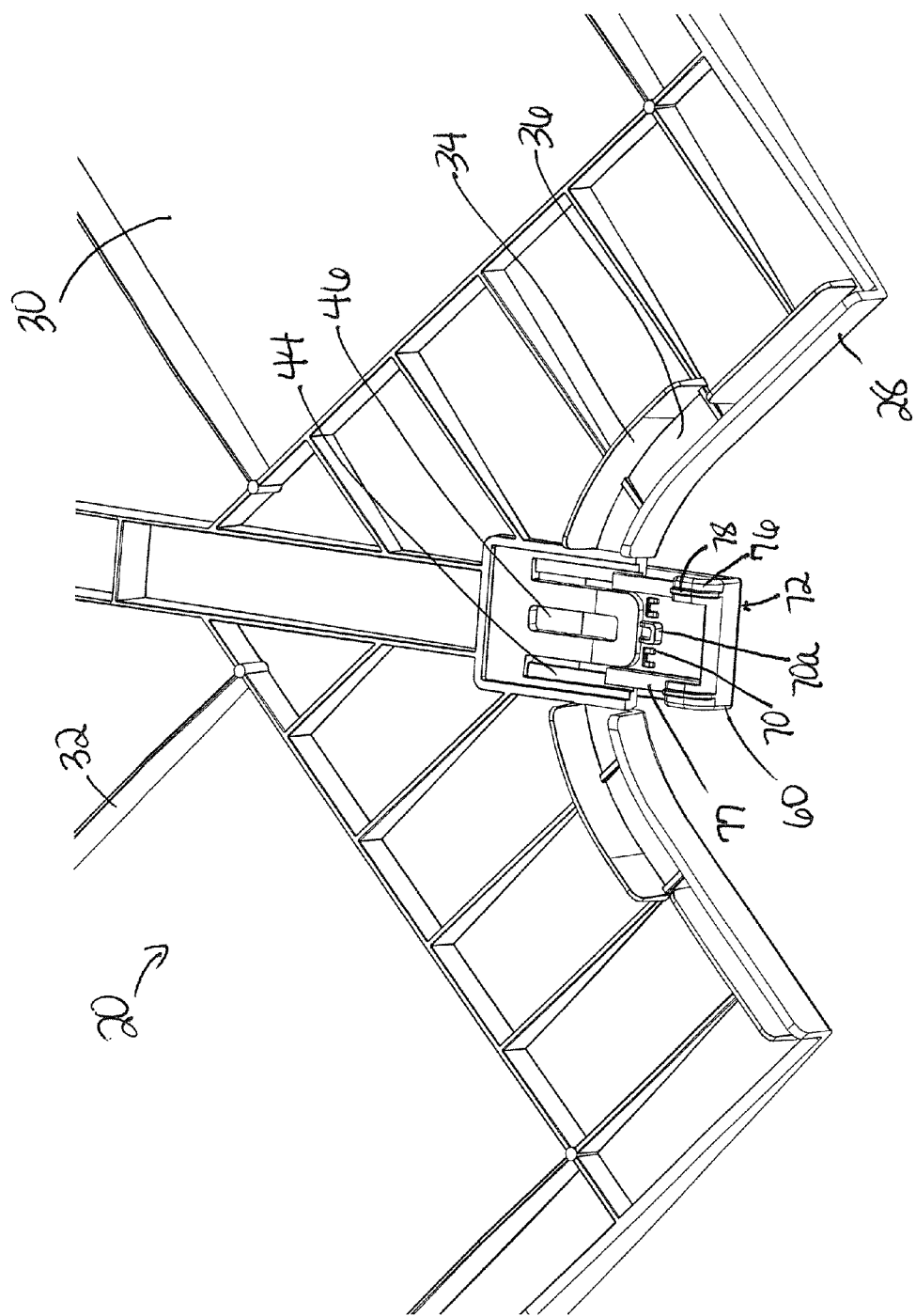

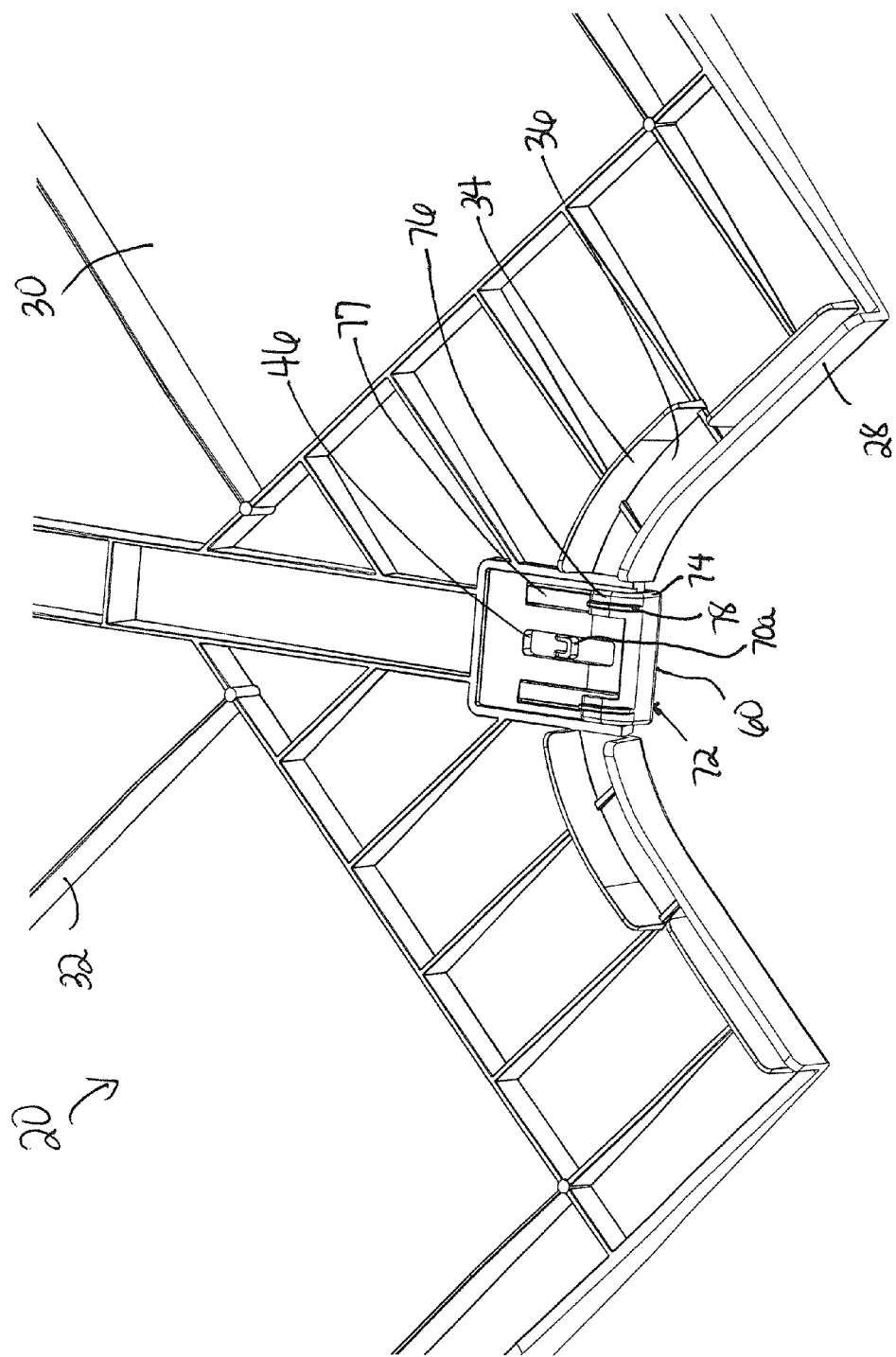

COVER FOR CABLE FITTING BASE

FIELD OF THE INVENTION

The present invention relates to a cover for a cable fitting base, and more particularly to a latch that releasably secures a cover on the cable fitting base.

BACKGROUND OF THE INVENTION

Raceway and duct systems are used to route, protect and conceal data, voice, video and/or fiber-optic cabling. Overhead raceway systems allow custom installation and can be provided above network cabinet equipment, allowing ready access for reconfiguration, repair or installation of additional equipment. Such systems can be formed from various sections of raceway or duct, including straight sections, 90 degree corner fittings, 45 degree corner fittings, T fittings, four-way intersection (X) fittings, and the like, which are affixed together by way of a duct coupler.

Typical raceway systems consist of troughs or fittings made up of a base member and a cover. The cover may be a hinged cover or a snap-on cover. In operation, the snap-on cover must be removed to allow access to a cable receiving cavity within the base member. When a long raceway made up of several raceway sections is involved, it may be difficult and/or time consuming to remove all of the covers and to return them after the installation.

It is desirable to have a raceway or cable management system with base members and covers that are easily installed, secured and removed without the use of tools.

SUMMARY OF THE INVENTION

A cable management system with a fitting base and a cover is disclosed. The fitting base includes a bottom and sidewalls with a top edge. The cover includes a top having a latch receiving area, a bottom and a sliding latch. The sliding latch is positioned on the latch receiving area. The sliding latch includes a first end with a finger tab, a main body and a second end with locking feet. The sliding latch releasably secures the cover to the fitting base.

BRIEF DESCRIPTION OF THE DRAWINGS

FIG. 3B is a partial sectional view of the bottom of the half cover illustrated in FIG. 3 with the sliding latch positioned to be received in the latch receiving area;

FIG. 3C is a partial sectional view of the bottom of the half cover of FIG. 3;

DETAILED DESCRIPTION

Figure 1:
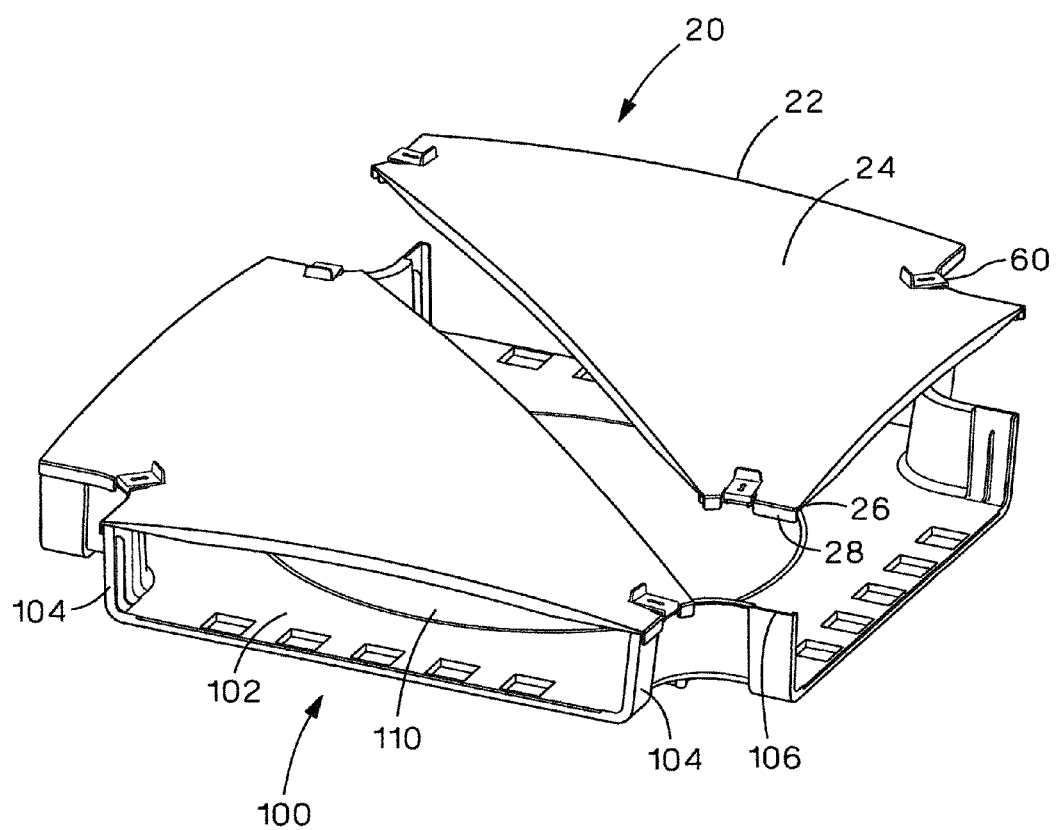
FIG. 1 is a perspective view of the cover of the present invention partially installed on a four-way cross fitting base.

FIG. 1 illustrates a perspective view of the cover 20 of the present invention partially installed on a four-way cross fitting base 100. The fitting base 100 includes a bottom 102 and sidewalls 104 forming a channel or pathway 110. The sidewalls 104 of the fitting base include a top edge 106. As discussed below, the top edge 106 includes a lip 108 extending away from the sidewalls 104.

The cover 20 installed over the four-way cross fitting base 100 is formed from two identical cover halves 22. The split cover design facilitates the handling and installation of the cover 20 over the fitting base 100. FIG. 1 illustrates the left half of the cover fully installed and the right half of the cover positioned to be installed on the fitting base.

Figure 2:
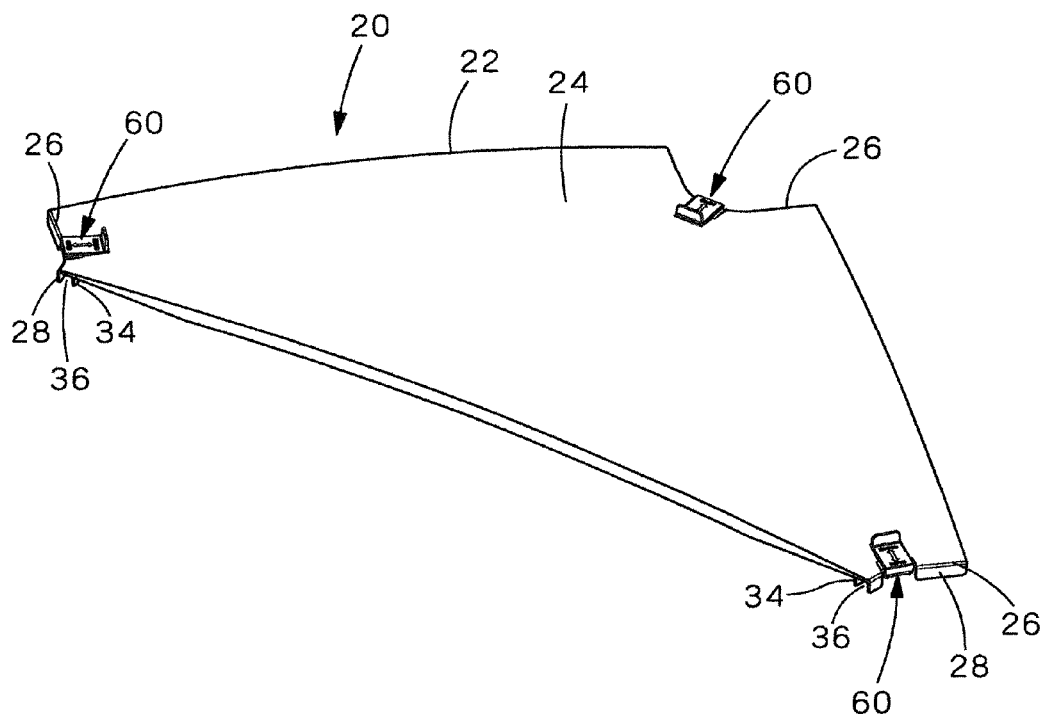
FIG. 2 is a top perspective view of a single half cover illustrated in FIG. 1.

As illustrated in FIGS. 1 and 2, the cover halves 22 have a crowned profile to increase the strength and rigidity of each cover half 22.

Figure 3:
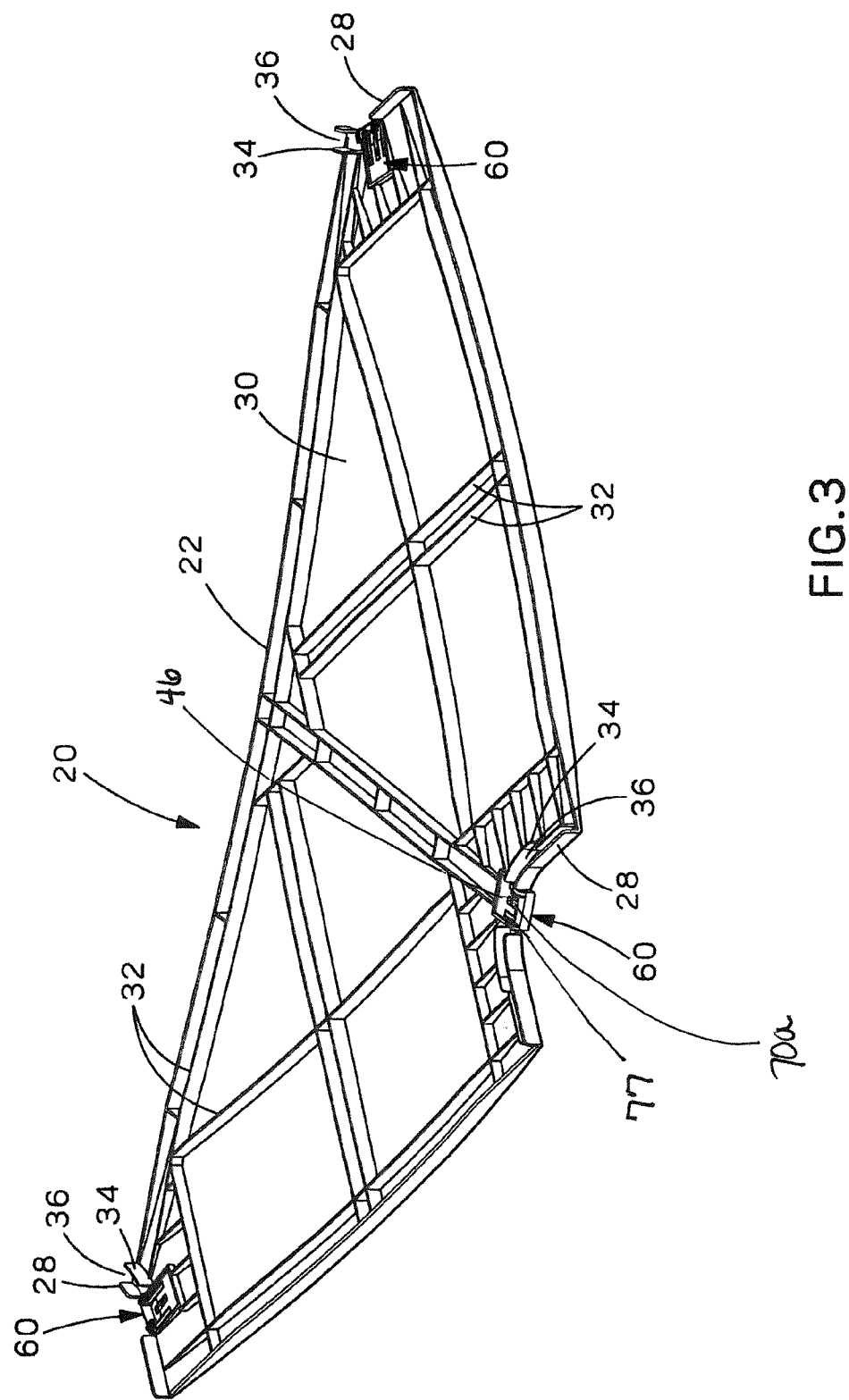
FIG. 3 is a bottom perspective view of the single half cover illustrated in FIG. 2.
Figure 3A:
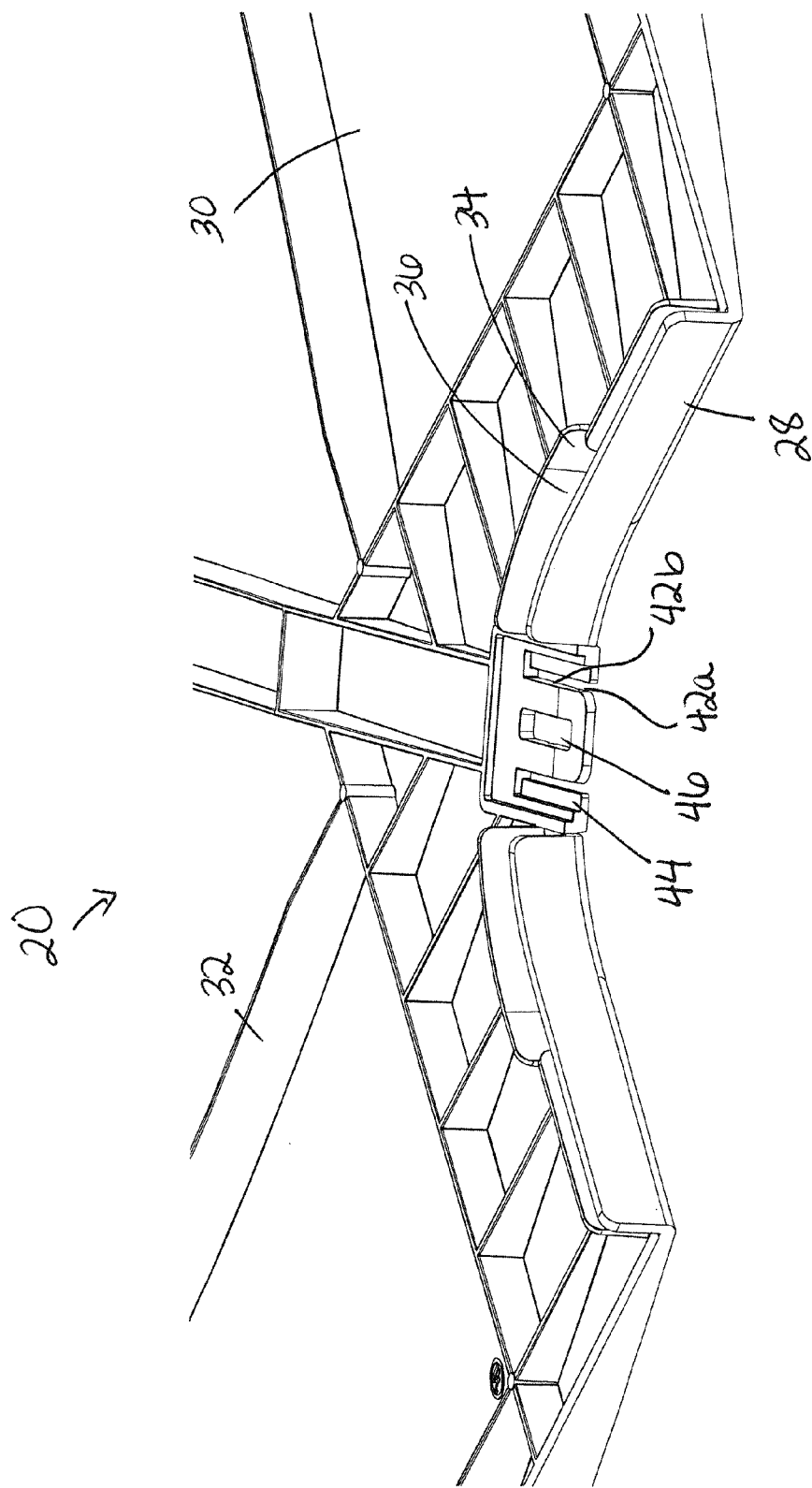
FIG. 3A is a partial sectional view of the bottom of the half cover illustrated in FIG. 3 with the sliding latch removed.
Figure 3D:
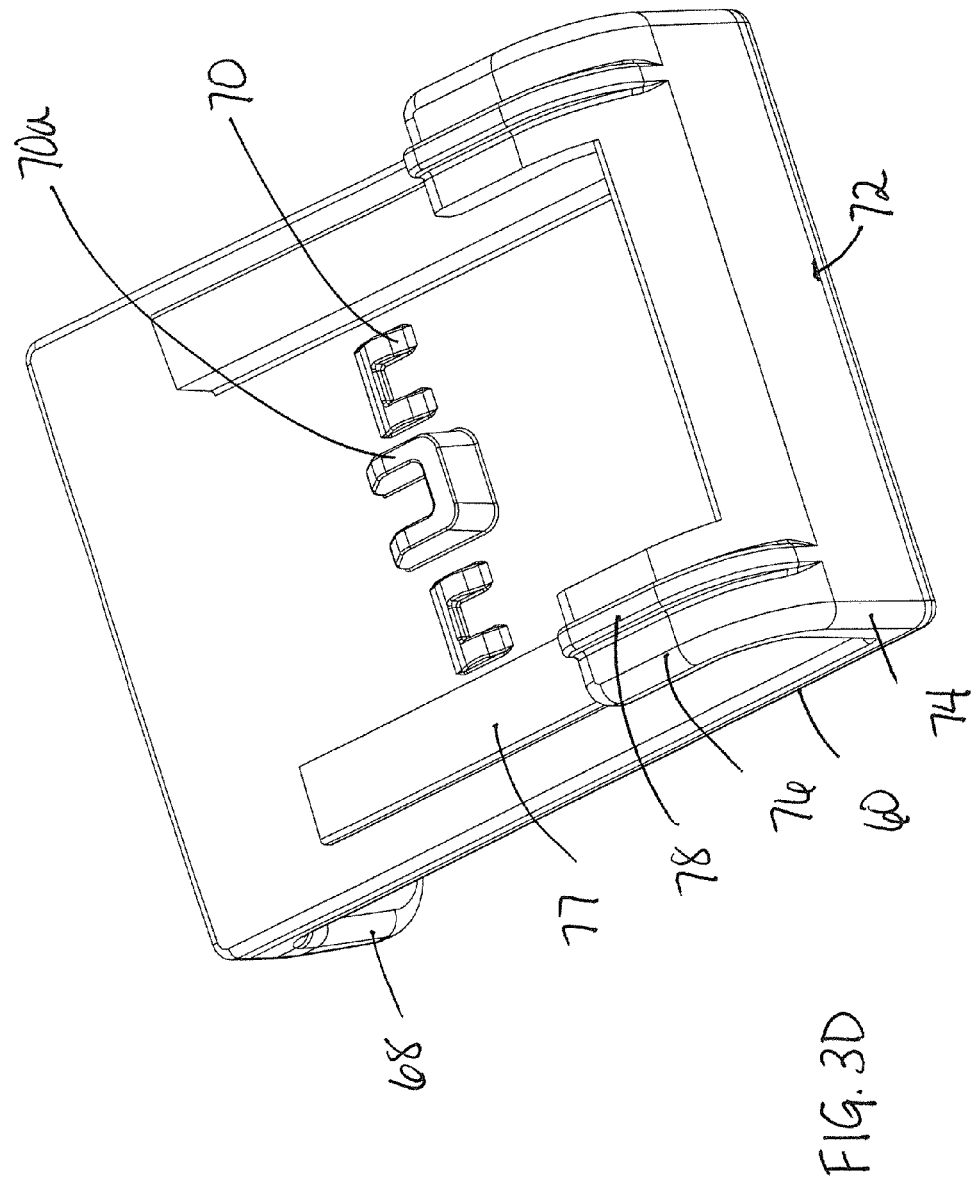
FIG. 3D is a bottom front perspective view of the sliding latch of FIG. 1.
Figure 3E:
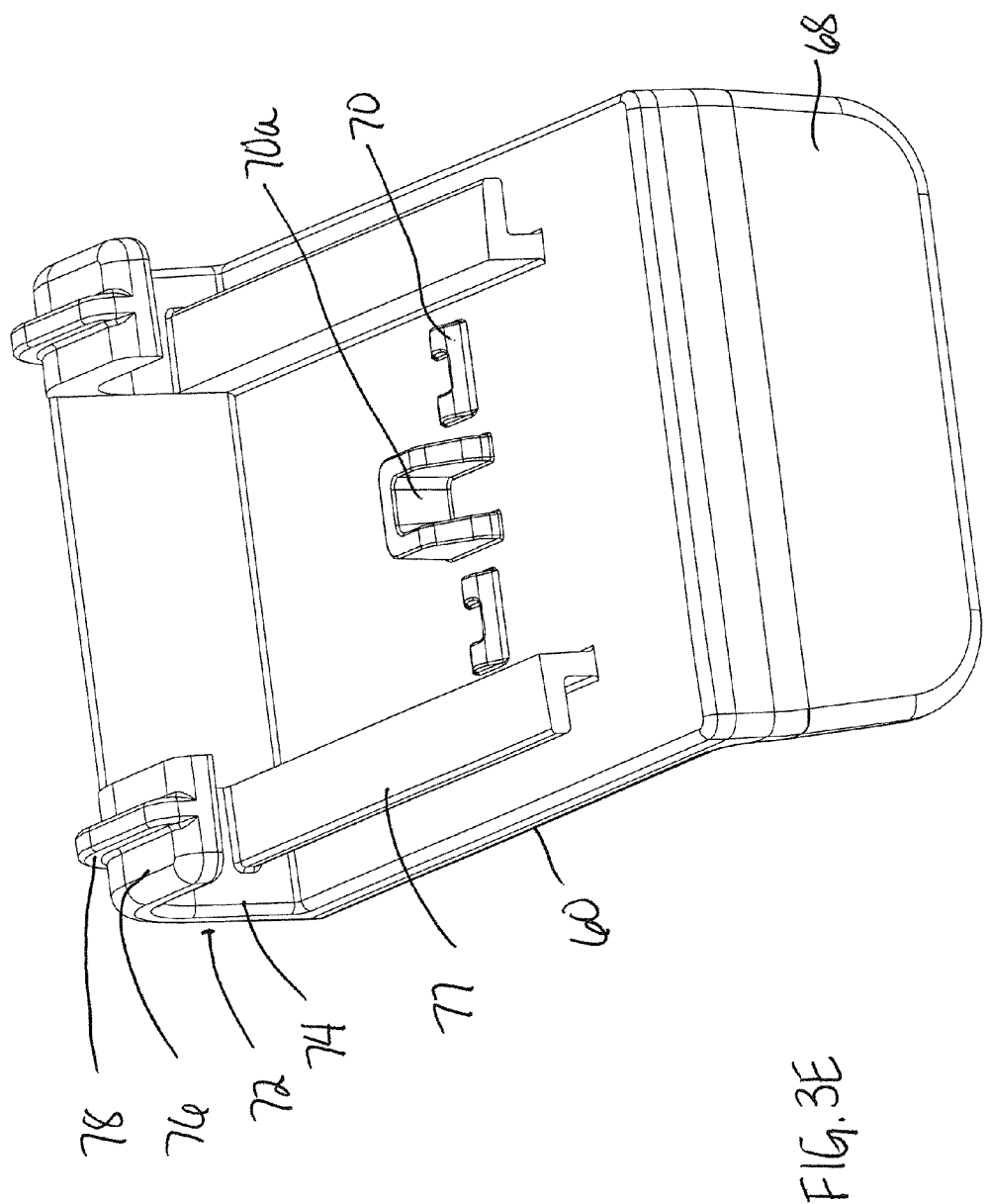
FIG. 3E is a bottom back perspective view of the sliding latch of FIG. 1.

FIGS. 2 and 3 illustrate one of the identical cover halves 22. FIG. 2 illustrates the top 24 of the cover half 22. Each cover half 22 includes three sliding latches 60 positioned at the outer ends 26 of the cover half 22. The outer ends 26 of the cover half 22 include a downwardly extending edge 28. The downwardly extending edges 28 are positioned adjacent to the sliding latches 60. Although the cover half 22 is illustrated with three sliding latches, it is contemplated that the number of sliding latches on the cover may vary depending on the dimensions of the cover and the fitting base.

FIG. 3 illustrates the bottom 30 or underside of the cover half 22. The cover half 22 includes a plurality of ribs 32 positioned along the underside to prevent the cover half 22 from sagging. The cover half 22 also includes ribs 34. Ribs 34 are positioned adjacent to each sliding latch 60 such that the ribs 34 are spaced from the outer ends 26 of the cover half 22 and the downwardly extending edge 28. The downwardly extending edge 28 of the cover half 22 and each rib 34 defines a channel 36 therebetween for receiving a portion of the fitting base 100. The downwardly extending edge 28, the ribs 34 and the channel 36 provide a keyed feature that ensures the proper placement of the cover half 22 over the fitting base 100. FIGS. 3A-3E illustrate a partial sectional view of the bottom of the half cover illustrated in FIG. 3 and the bottom of the sliding latch 60. The bottom of the cover includes the latch receiving area with stepped rails 44 and a center slot 46. FIG. 3B illustrates one of the sliding latches 60 being installed in the latch receiving area.

Figure 4:
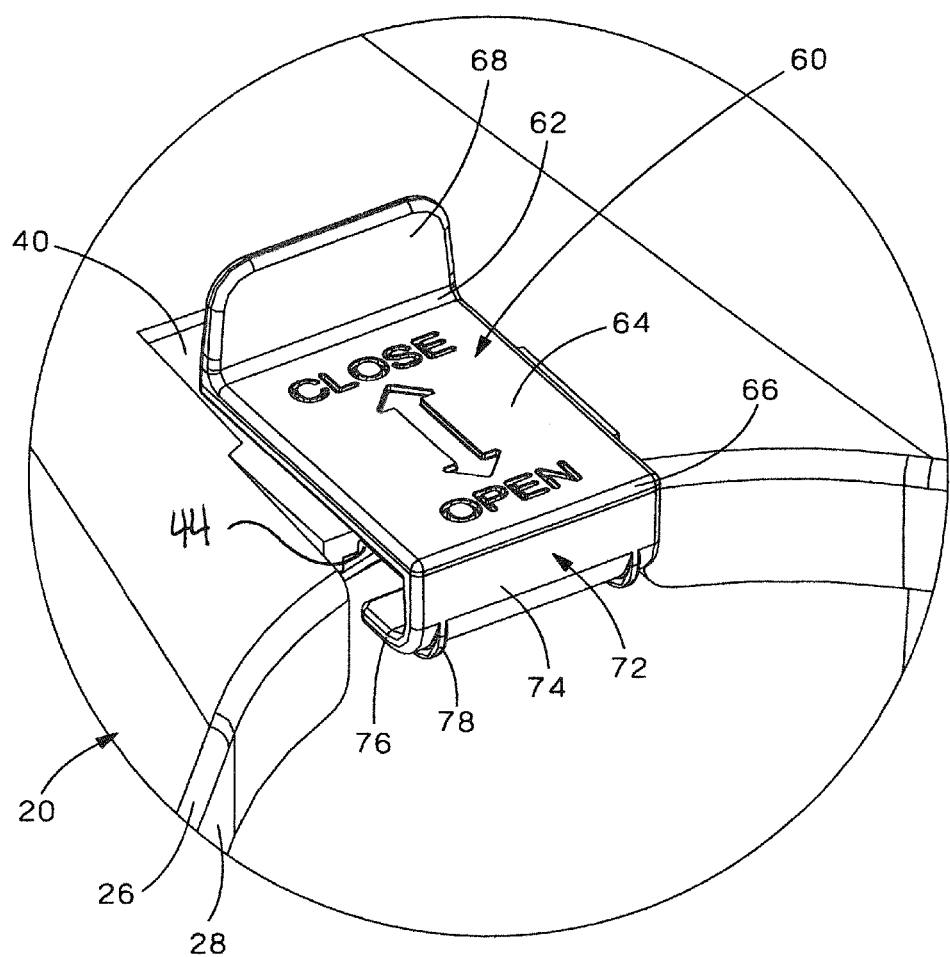
FIG. 4 is a top perspective view of one of the sliding latches of the cover illustrated in FIG. 1 in an open position.
Figure 5:
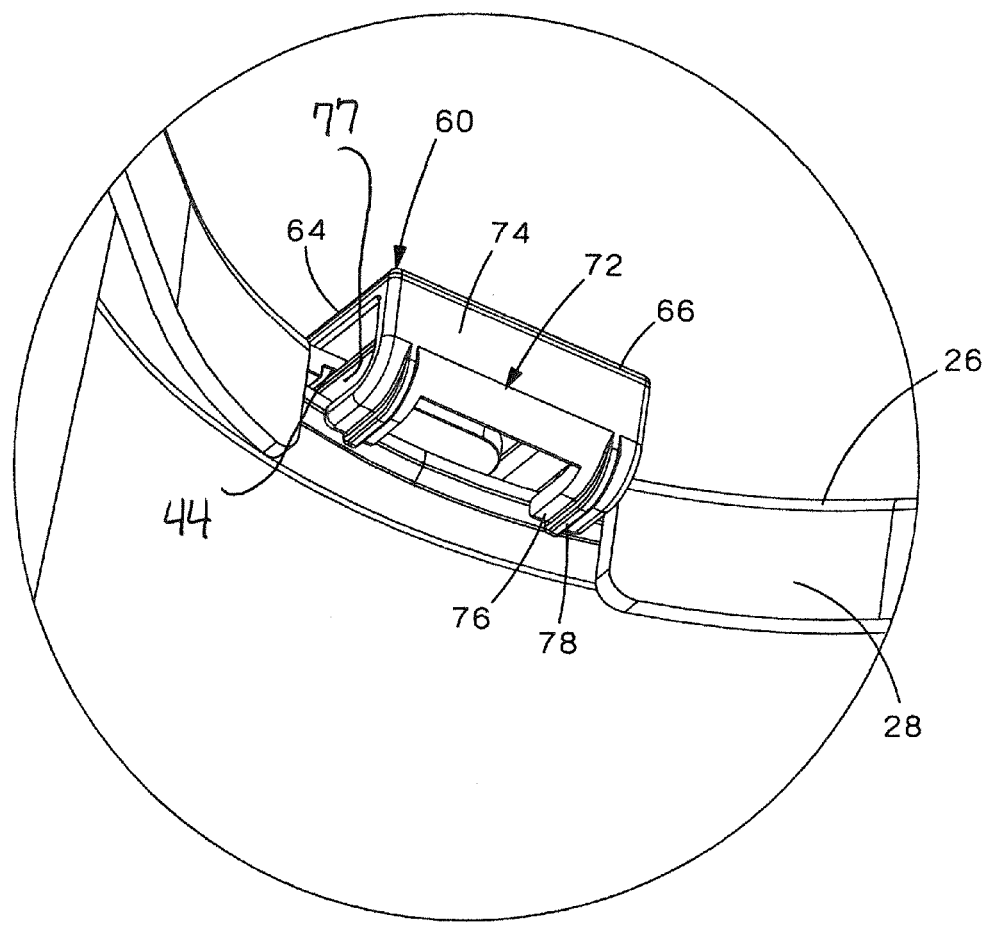
FIG. 5 is a bottom perspective view of the sliding latch illustrated in FIG. 4 in the open position.
Figure 6:
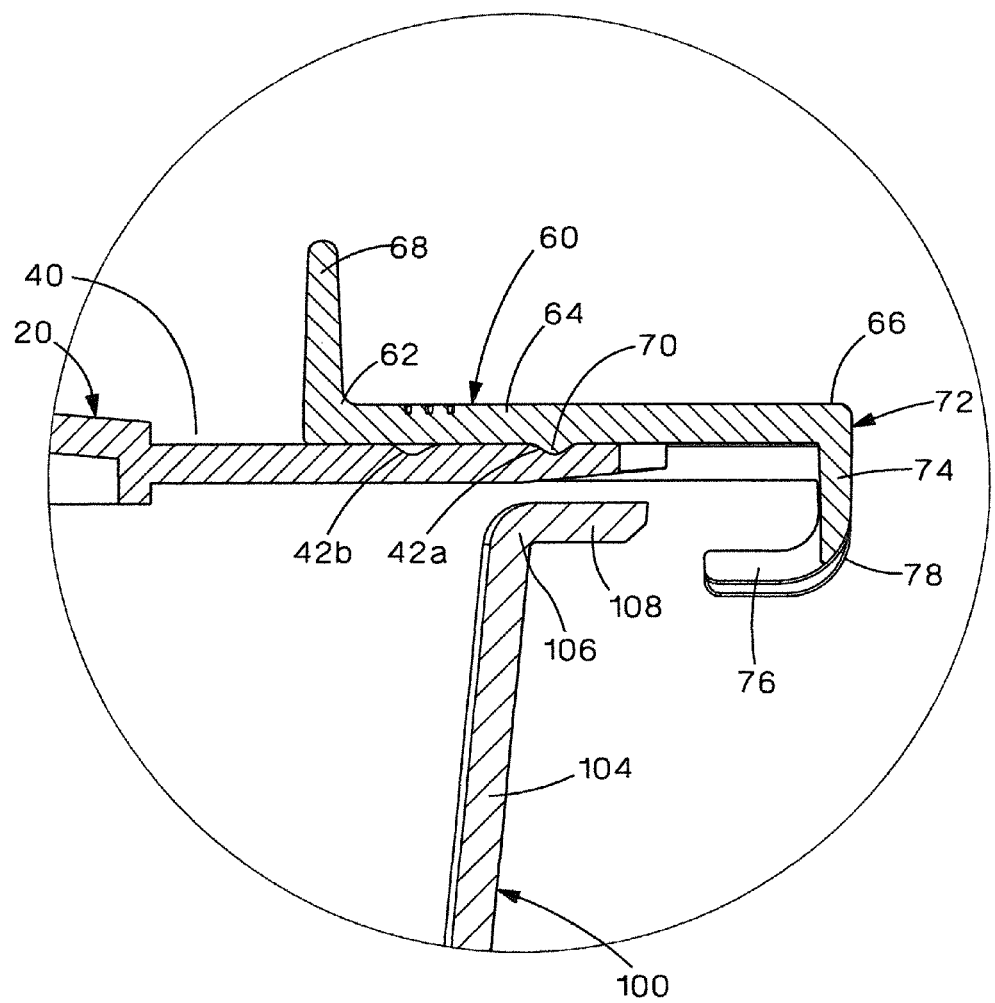
FIG. 6 is a cross sectional view of the sliding latch illustrated in FIG. 4 in the open position.

FIGS. 4-9 illustrate one of the sliding latches 60 installed on the cover 20 of the present invention. The cover includes a plurality of latch receiving areas, such as recessed areas 40 that maintain the sliding latches 60. FIGS. 4-6 illustrate a top of the cover 20 and the sliding latch 60 positioned within the recessed area 40 in an extended open position.

The sliding latch 60 includes a first end 62, a main body 64 and a second end 66. The first end 62 of the sliding latch 60 includes an upwardly extending finger tab 68. The finger tab 68 allows the sliding latch 60 to be engaged and easily moved from an open position to a closed position. The second end 66 of the sliding latch 60 includes locking feet 72 and legs 77. As illustrated in FIGS. 3B, 3C, 4, and 5, legs 77 of the sliding latch 60 slide along the stepped rails 44. As illustrated in FIGS. 5 and 6, each locking foot 72 includes a downwardly extending member 74, an inwardly extending member 76 and an outer rib 78 for strength. The inwardly extending members 76 of the locking feet 72 are spaced from and positioned under the main body 64 closer to the second end 66 of the sliding latch 60.

As illustrated in FIG. 6, the cover 20 also includes detents 42a, 42b formed in each recessed area 40 of the cover 20. The bottom of the main body 64 of each sliding latch 60 includes a protrusion 70 that is designed to engage the detents 42a, 42b in the cover 20. The sliding latch 60 also includes a center protrusion 70a (see FIGS. 3 and 3C-3F) designed to engage the center slot 46. The detents 42a, 42b and the protrusion 70 hold the sliding latch 60 in the open or closed position, as desired. When the sliding latch 60 is in the open position, the protrusion 70 is located in the first detent 42a.

FIG. 6 also illustrates the lip 108 extending from the top edge 106 of the fitting base 100. The lip 108 extends outward away from the sidewalls 104 of the fitting base 100. When the sliding latch 60 is in the open position, the locking feet 72 are spaced from the lip 108. As a result, there is sufficient clearance between the lip 108 of the fitting base 100 and the inwardly extending members 76 of the locking feet 72 of the sliding latch 60 to remove the cover 20 from the fitting base 100.

Figure 7:
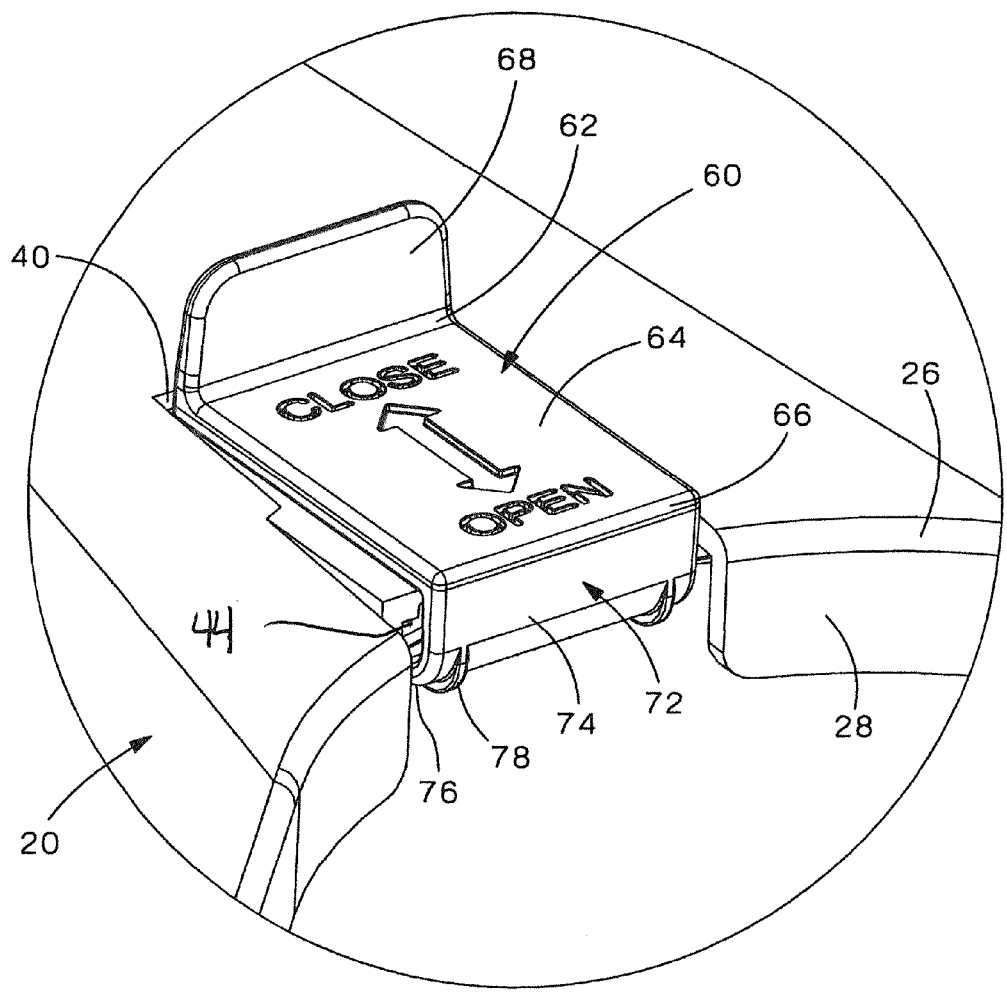
FIG. 7 is a top perspective view of one of the sliding latches of the cover illustrated in FIG. 1 in a closed position.
Figure 8:
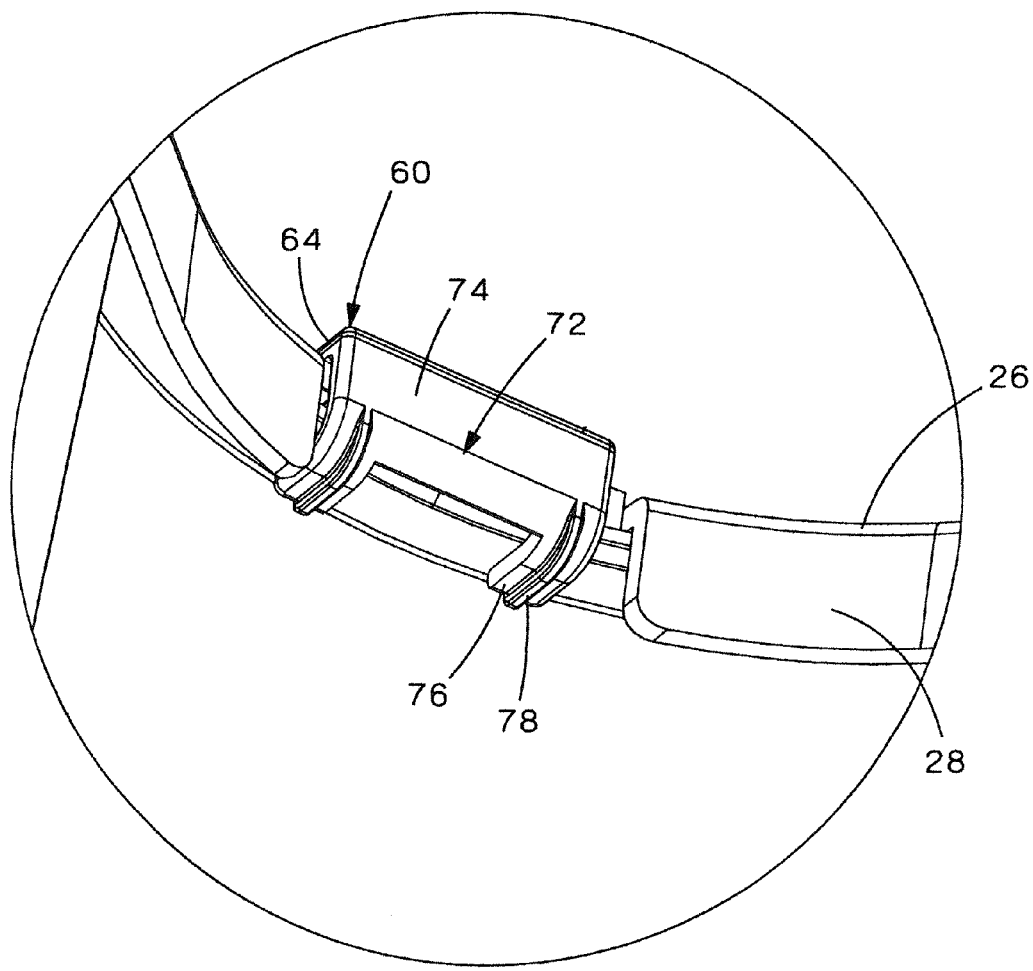
FIG. 8 is a bottom perspective view of the sliding latch illustrated in FIG. 7 in the closed position.
Figure 9:
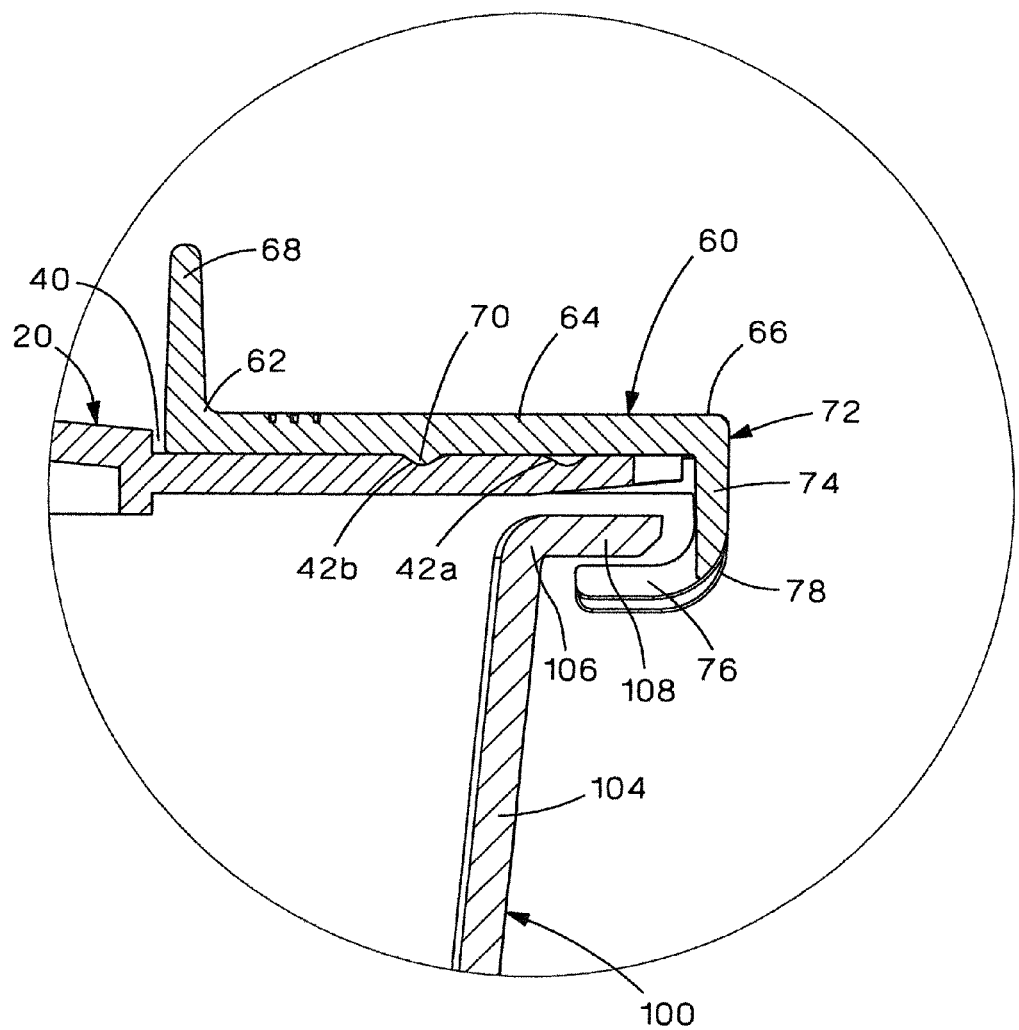
FIG. 9 is a cross sectional view of the sliding latch illustrated in FIG. 7 in the closed position.

FIGS. 7-9 illustrate the sliding latch 60 in a closed position. In the closed position, the sliding latch 60 is pushed inward toward the center of the cover 20 such that it is positioned within the recessed area 40. As illustrated in FIG. 9, once the sliding latch 60 has been slid into the closed position, the protrusion 70 is located in the second detent 42b and the inwardly extending members 76 of the locking feet 72 are positioned under the lip 108 to secure the cover 20 to the fitting base 100.

Figure 10:
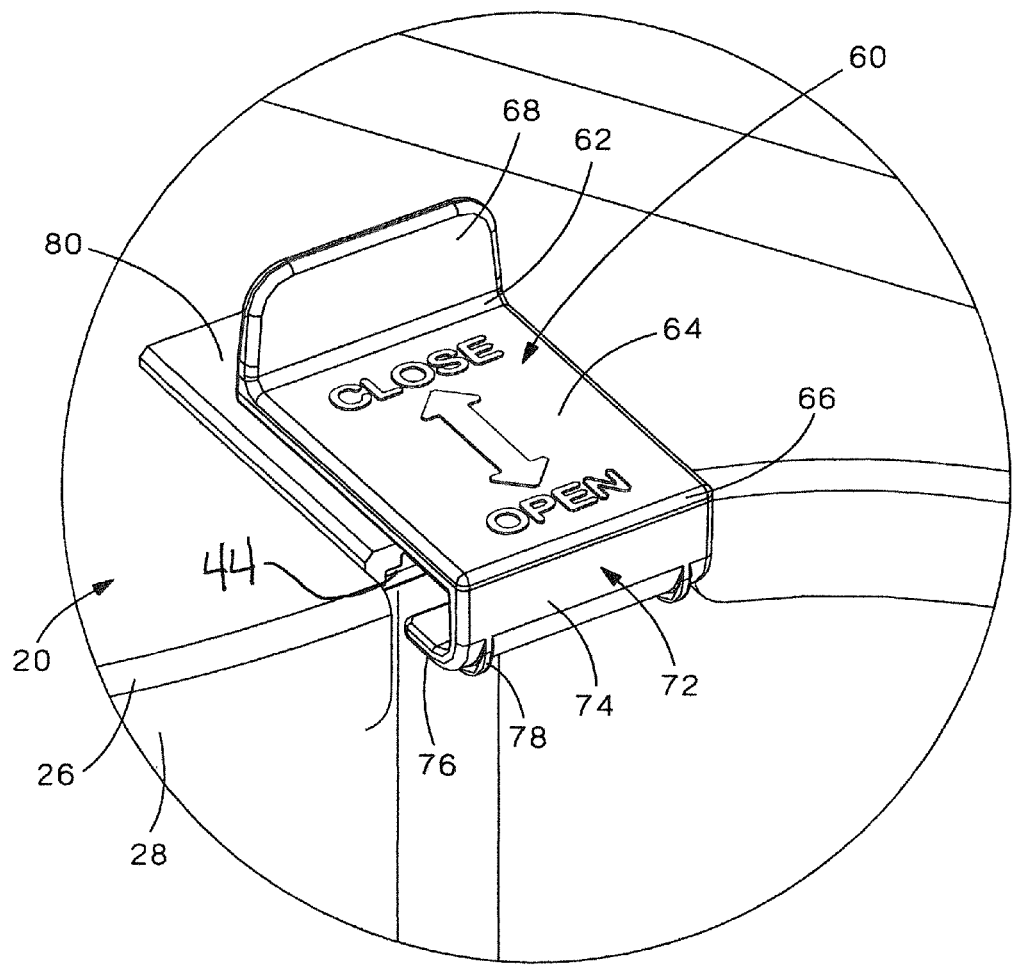
FIG. 10 is a top perspective view of one of the sliding latches of the cover in an open position and positioned on an alternative latch receiving area.
Figure 11:
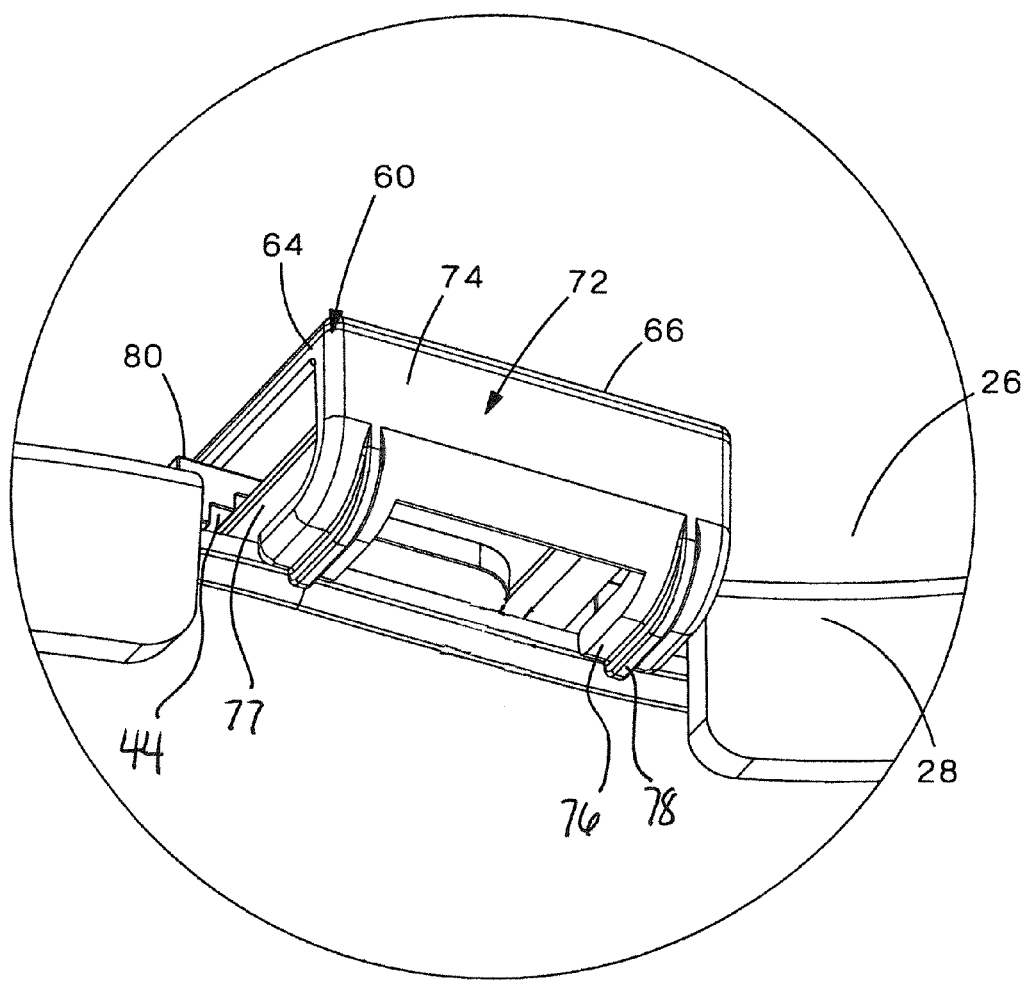
FIG. 11 is a bottom perspective view of the sliding latch illustrated in FIG. 10 in the open position.
Figure 12:
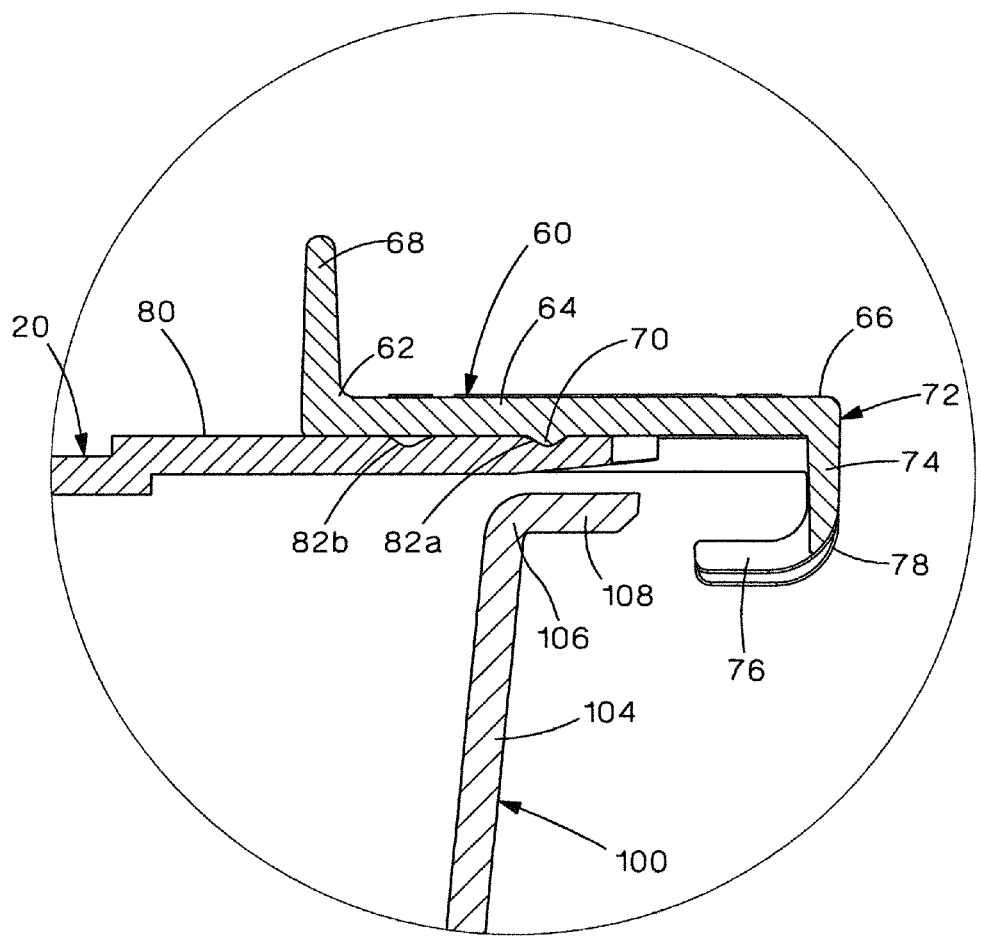
FIG. 12 is a cross sectional view of the sliding latch illustrated in FIG. 10 in the open position.

FIGS. 10-15 illustrate one of the sliding latches 60 of the present invention installed on an alternative latch receiving area, such as a raised area 80. FIGS. 10-12 illustrate a top of the cover and the sliding latch 60 positioned on the raised area 80 in an extended position.

As illustrated in FIG. 12, the raised area 80 also includes detents 82a, 82b. As discussed above, the bottom of the main body 64 of each sliding latch 60 includes a protrusion 70. The protrusion 70 is designed to engage the detents 82a, 82b in the raised area 80. The detents 82a, 82b and the protrusion 70 hold the sliding latch 60 in the open or closed position, as desired. When the sliding latch 60 is in the open position, the protrusion 70 is located in the first detent 82a.

Figure 13:
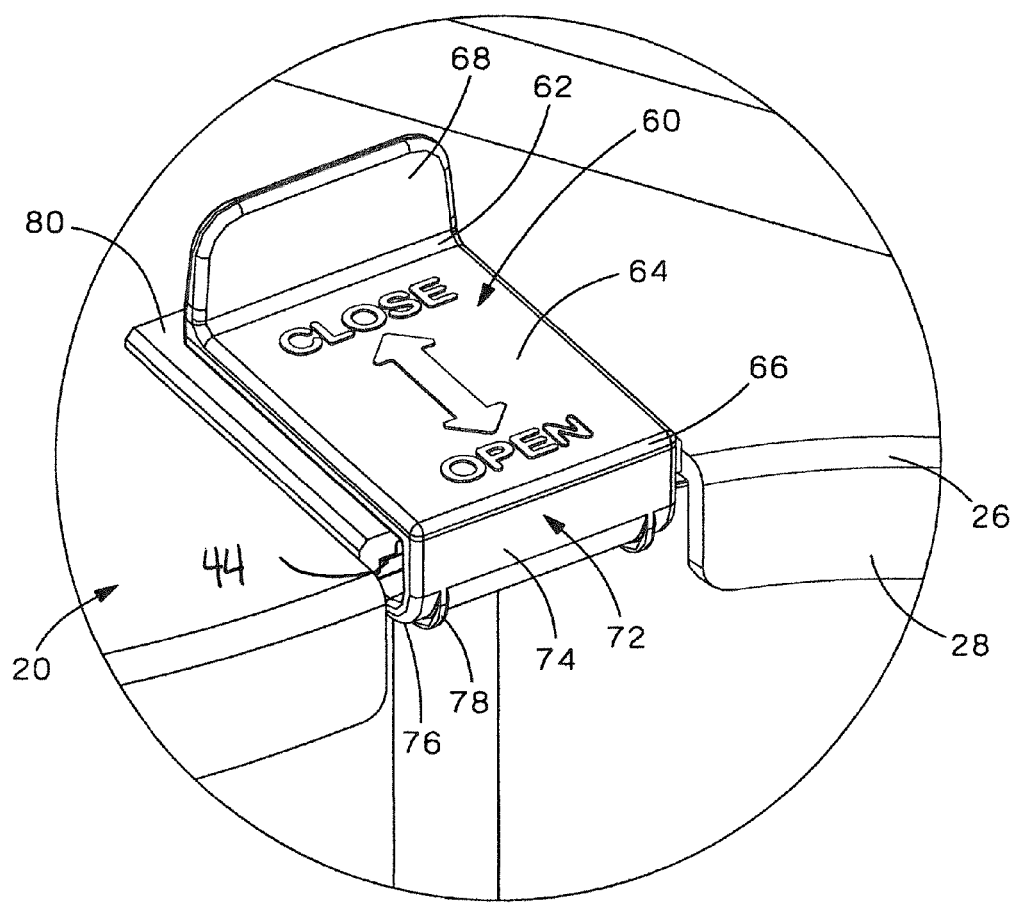
FIG. 13 is a top perspective view of one of the sliding latches of the cover in a closed position and positioned on an alternative latch receiving area.
Figure 14:
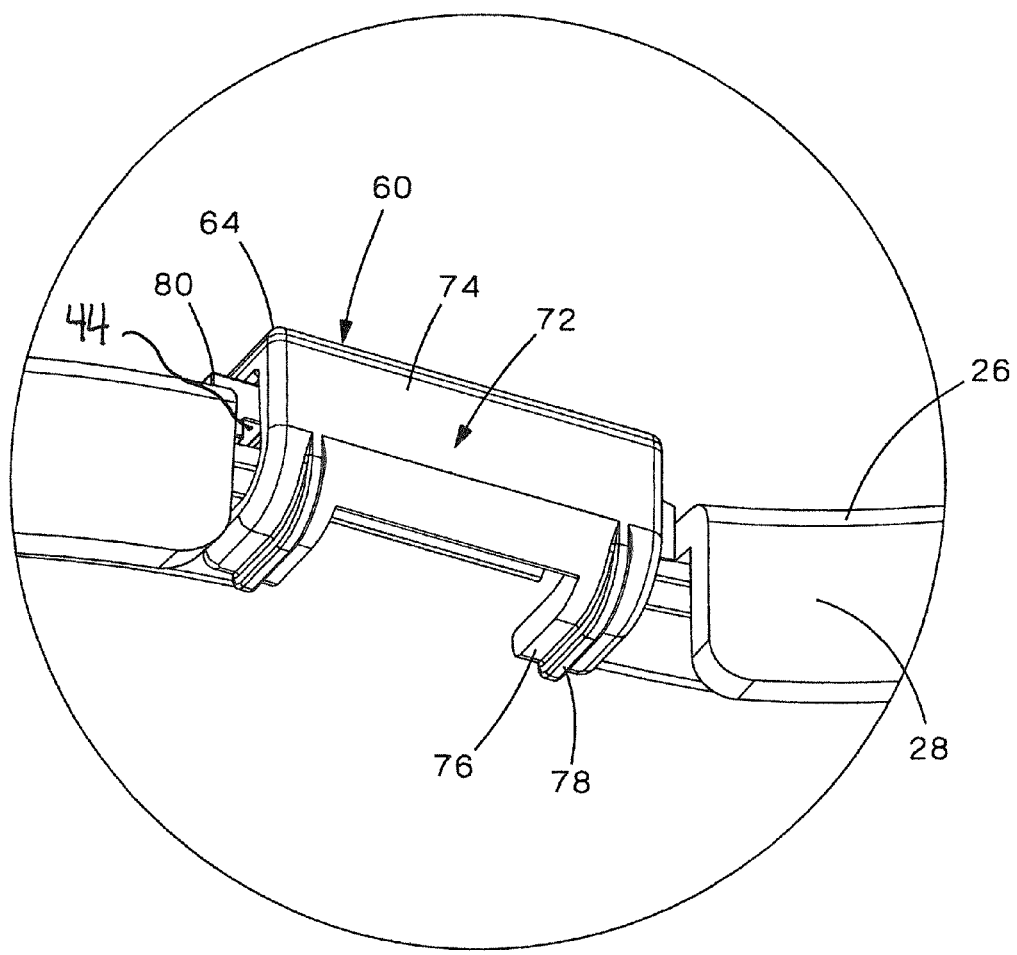
FIG. 14 is a bottom perspective view of the sliding latch illustrated in FIG. 13 in the closed position.
Figure 15:
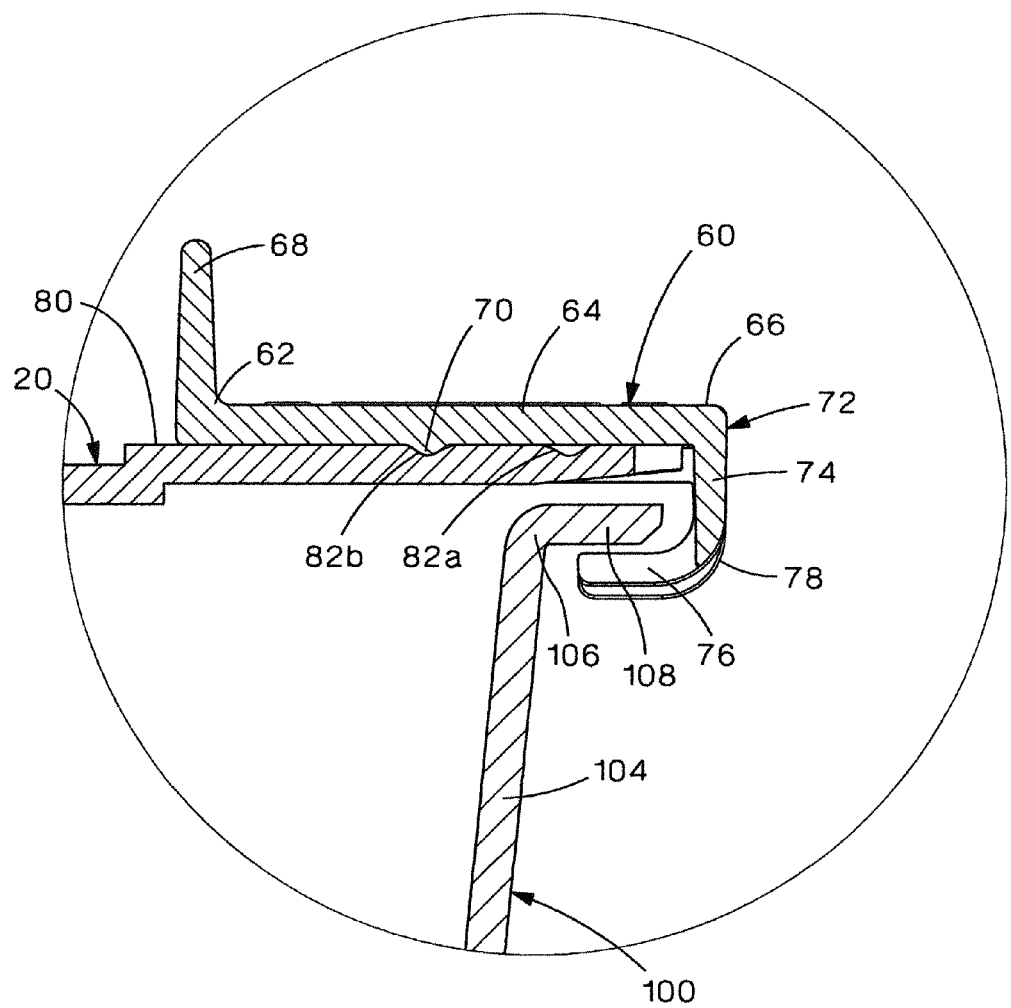
FIG. 15 is a cross sectional view of the sliding latch illustrated in FIG. 13 in the closed position.

FIGS. 13-15 illustrate the sliding latch 60 positioned on the raised area 80 in a closed position. In the closed position, the sliding latch 60 is pushed inward toward the center of the cover 20. As illustrated in FIG. 15, once the sliding latch 60 has been slid into the closed position, the protrusion 70 is located in the second detent 82b and the inwardly extending members 76 of the locking feet 72 are positioned under the lip 108 to secure the cover 20 to the fitting base 100.

Figure 16:
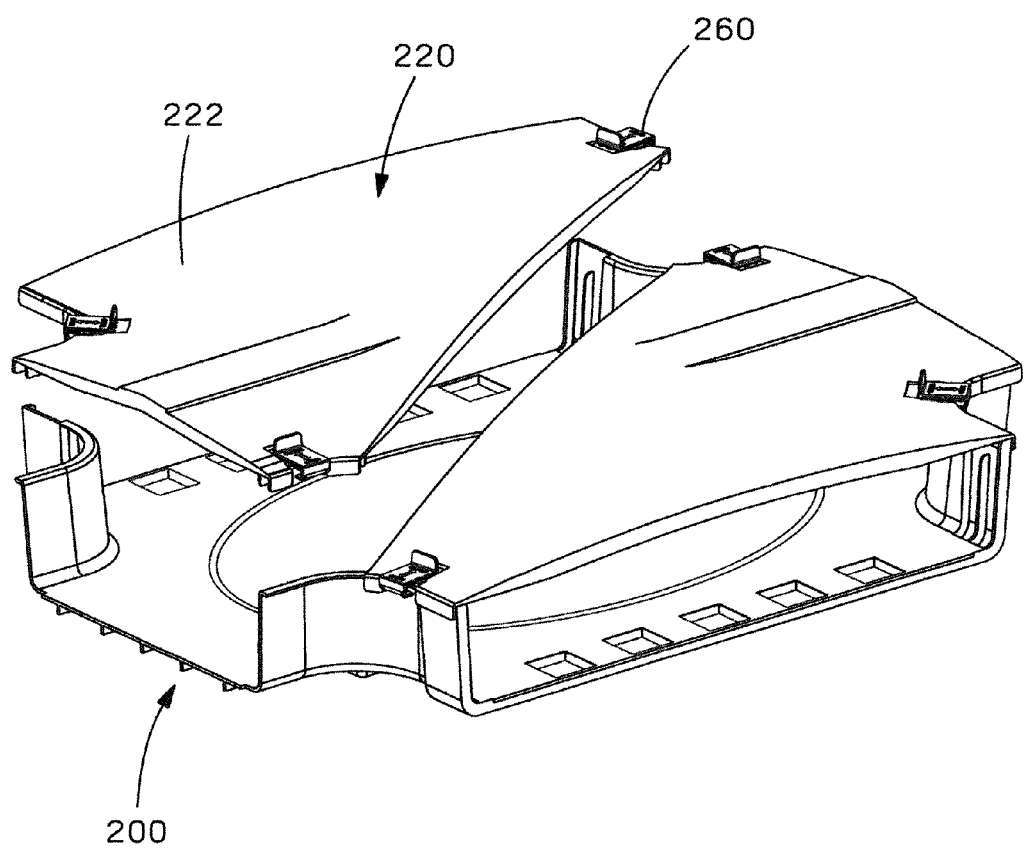
FIG. 16 is a perspective view of an alternative cover of the present invention installed on a four-way cross fitting base with narrow exits.
Figure 17:
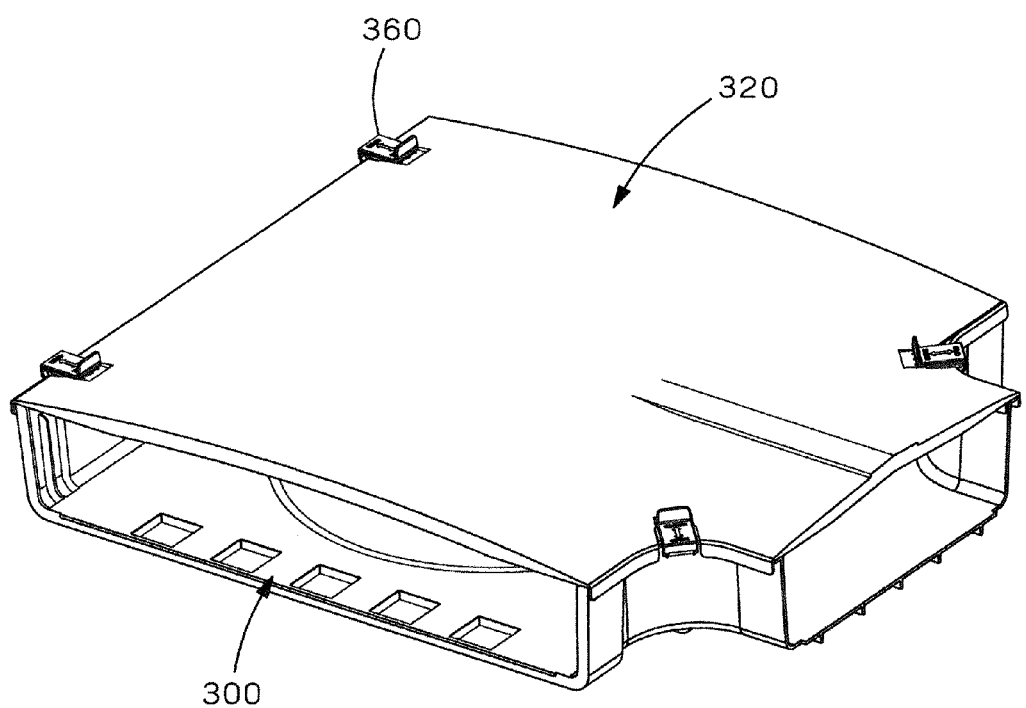
FIG. 17 is a perspective view of an alternative cover of the present invention installed on a tee fitting base with a narrow exit.
Figure 18:
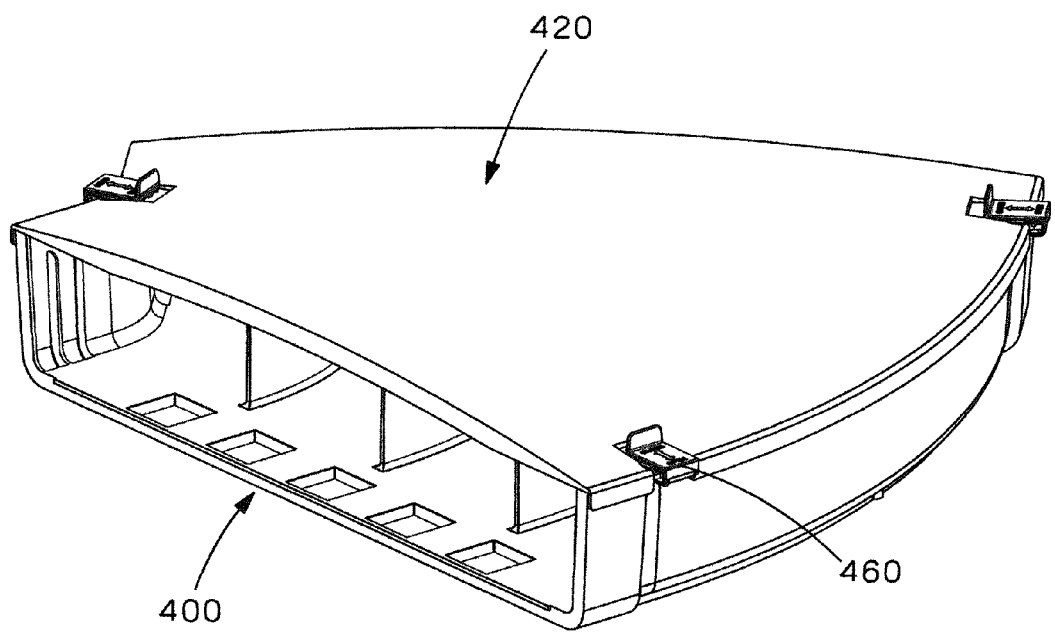
FIG. 18 is a perspective view of an alternative cover of the present invention installed on a horizontal 45 degree fitting base.

FIGS. 16-18 illustrate alternative embodiments of the cover of the present invention installed over various fittings 200, 300, and 400 in a cable routing system.

FIG. 16 illustrates an alternative embodiment of the cover of the present invention designed to fit over a four-way cross fitting base 200 with narrow exits. The cover 220 is also designed with two identical cover halves 222. Each cover half 222 includes three sliding latches 260 for securing the cover 220 to the fitting base 200, as described above.

FIG. 17 illustrates an alternative embodiment of the cover of the present invention designed to fit over a tee fitting base 300 with a narrow exit. The cover 320 for the tee fitting base 300 includes four sliding latches 360 with one sliding latch 360 positioned near each corner of the cover 320.

FIG. 18 illustrates an alternative embodiment of the cover of the present invention designed to fit over a horizontal 45 degree fitting base 400. The cover 420 for the horizontal 45 degree fitting base 400 includes three sliding latches 460 positioned near the ends of the cover 420.

The cover with the sliding latches of the present invention is easy to install, secure and remove, as desired, over a variety of fitting bases in a cable routing system.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A cover for a cable fitting base, the cover comprising:
   a top and a bottom opposite the top;
   outer ends with a downwardly extending edge;
   at least one latch receiving area, a bottom of the at least one latch receiving area having L-shaped stepped rails that form a cantilevered member therebetween, the cantilevered member having a center slot; and
   at least one sliding latch, the sliding latch having a first end and a second end, wherein the second end having L-shaped legs having a length, wherein the length extending from a bottom of the sliding latch, the L-shaped legs of the sliding latch positioned on the L-shaped stepped rails of the at least one latch receiving area;
   wherein the at least one sliding latch further comprising a center protrusion extending from the bottom of the sliding latch and positioned between the L-shaped legs, whereby the L-shaped legs of the sliding latch slide along the L-shaped stepped rails and the center protrusion engages and slides within the center slot to releasably secure the cover to the cable fitting base.

2. The cover of claim 1, wherein the cover includes a crowned profile for increasing the rigidity of the cover.

3. The cover of claim 1, wherein the cover includes two identical half members.

4. The cover of claim 1, wherein the at least one sliding latch having a finger tab extending from the first end.

5. The cover of claim 1, wherein the at least one sliding latch having a protrusion and the latch receiving area includes a plurality of detents for receiving the protrusion to maintain a position of the at least one sliding latch.

6. The cover of claim 1, wherein the at least one sliding latch having locking feet extending from the second end, whereby the locking feet secure the cover to the cable fitting base.

7. The cover of claim 6, wherein the locking feet include a downwardly extending member, an inwardly extending member and an outer rib.

8. The cover of claim 1, wherein the latch receiving area of the top is a recessed area formed within the top.

9. The cover of claim 1, wherein the latch receiving area of the top is a raised area formed on the top so as to extend from the top.

* * * * *